United States Patent
Liu et al.

(10) Patent No.: US 10,592,775 B2
(45) Date of Patent: Mar. 17, 2020

(54) IMAGE PROCESSING METHOD, IMAGE PROCESSING DEVICE AND IMAGE PROCESSING SYSTEM

(71) Applicant: VIVOTEK INC., New Taipei (TW)

(72) Inventors: Cheng-Chieh Liu, New Taipei (TW); Chih-Yen Lin, New Taipei (TW)

(73) Assignee: VIVOTEK INC., New Taipei (TW)

(*) Notice: Subject to any disclaimer, the term of this patent is extended or adjusted under 35 U.S.C. 154(b) by 235 days.

(21) Appl. No.: 15/694,997

(22) Filed: Sep. 4, 2017

(65) Prior Publication Data
US 2018/0096225 A1 Apr. 5, 2018

(30) Foreign Application Priority Data
Sep. 30, 2016 (TW) .............................. 105131479 A

(51) Int. Cl.
| G06K 9/62 | (2006.01) |
| G06K 9/46 | (2006.01) |
| G06T 1/60 | (2006.01) |
| G06T 11/20 | (2006.01) |
| G06K 9/00 | (2006.01) |

(52) U.S. Cl.
CPC ......... G06K 9/6218 (2013.01); G06K 9/4604 (2013.01); G06T 1/60 (2013.01); G06T 11/20 (2013.01); *G06K 9/00335* (2013.01); *G06T 11/206* (2013.01)

(58) Field of Classification Search
CPC ............... G06K 9/6218; G06K 9/4604; G06K 9/00335; G06T 1/60; G06T 11/20; G06T 11/206
See application file for complete search history.

(56) References Cited

U.S. PATENT DOCUMENTS

| 5,163,124 A * | 11/1992 | Yabe ..................... G06F 1/3203 713/324 |
| 5,764,283 A * | 6/1998 | Pingali .................... G01S 11/12 348/169 |
| 6,520,864 B1 * | 2/2003 | Wilk .................. A63B 24/0006 473/152 |
| 6,526,156 B1 * | 2/2003 | Black ....................... G06K 9/32 382/103 |
| 6,778,171 B1 * | 8/2004 | Kikinis .................... G06T 19/00 342/357.31 |
| 7,636,093 B1 * | 12/2009 | Kuwamoto ............. G06T 13/80 345/474 |
| 9,245,196 B2 | 1/2016 | Marks |
| 2006/0045354 A1 * | 3/2006 | Hanna ................ G06K 9/00771 382/224 |
| 2006/0182316 A1 * | 8/2006 | Bang .................. G06K 9/00355 382/122 |

(Continued)

FOREIGN PATENT DOCUMENTS

TW 201033908 A1 9/2010

*Primary Examiner* — Samir A Ahmed
(74) *Attorney, Agent, or Firm* — Winston Hsu

(57) ABSTRACT

An image processing method includes steps of receiving an image sequence; when at least one object appears in the image sequence, analyzing a moving trajectory of each object; extracting at least one characteristic point from each moving trajectory; classifying the at least one characteristic point of each moving trajectory within a predetermined time period into at least one cluster; and storing at least one characteristic parameter of each cluster.

5 Claims, 10 Drawing Sheets

(56) References Cited

U.S. PATENT DOCUMENTS

| | | | | |
|---|---|---|---|---|
| 2012/0020518 A1* | 1/2012 | Taguchi | ............... | G06T 7/292 |
| | | | | 382/103 |
| 2013/0120405 A1* | 5/2013 | Maloney | ............... | G06T 13/00 |
| | | | | 345/474 |
| 2013/0268256 A1* | 10/2013 | Dariush | ............. | G06F 17/5095 |
| | | | | 703/8 |
| 2014/0003741 A1* | 1/2014 | Cui | ............... | G06T 7/30 |
| | | | | 382/298 |
| 2014/0100828 A1* | 4/2014 | Dariush | ............. | G06F 17/5095 |
| | | | | 703/2 |
| 2015/0094991 A1* | 4/2015 | John | ............... | G06F 17/5009 |
| | | | | 703/1 |
| 2016/0076908 A1* | 3/2016 | Pang | ............... | G06F 16/9537 |
| | | | | 701/494 |
| 2016/0148392 A1* | 5/2016 | Hepper | ............... | H04N 19/00 |
| | | | | 382/107 |

\* cited by examiner

IMAGE PROCESSING METHOD, IMAGE PROCESSING DEVICE AND IMAGE PROCESSING SYSTEM

BACKGROUND OF THE INVENTION

1. Field of the Invention

The invention relates to an image processing method, an image processing device, and an image processing system and, more particularly, to an image processing method, an image processing device, and an image processing system capable of reducing data storage amount effectively.

2. Description of the Prior Art

Heat map is used to represent the distribution and density of data points on a map or an image. To generate a heat map, the prior art determines the variations in continuous images based on the difference between images, so as to determine colors of the heat map, and stores the heat map by bitmap. Furthermore, another prior art stores moving trajectories of all objects in the images and then uses the stored data to draw the moving trajectories of all objects on the heat map. However, the data storage amount of the aforesaid manner is huge. The more the number of objects in the image is, the huger the data storage amount is. Consequently, hardware loading increases.

SUMMARY OF THE INVENTION

An objective of the invention is to provide an image processing method, an image processing device, and an image processing system capable of reducing data storage amount effectively, so as to solve the aforesaid problems.

According to an embodiment of the invention, an image processing method comprises steps of receiving an image sequence; when at least one object appears in the image sequence, analyzing a moving trajectory of each object; extracting at least one characteristic point from each moving trajectory; classifying the at least one characteristic point of each moving trajectory within a predetermined time period into at least one cluster; and storing at least one characteristic parameter of each cluster.

According to another embodiment of the invention, an image processing device comprises an image receiving unit, a storage unit, and a processing unit. The image receiving unit receives an image sequence. The processing unit is electrically connected to the image receiving unit and the storage unit. When at least one object appears in the image sequence, the processing unit analyzes a moving trajectory of each object, extracts at least one characteristic point from each moving trajectory, classifies the at least one characteristic point of each moving trajectory within a predetermined time period into at least one cluster, and stores at least one characteristic parameter of each cluster into the storage unit.

According to another embodiment of the invention, an image processing system comprises a host device and an image processing device. The host device comprises a storage unit and a processing unit. The processing unit is electrically connected to the storage unit. The image processing device communicates with the host device. The image processing device comprises an image receiving unit. The image receiving unit receives an image sequence and transmits the image sequence to the host device. When at least one object appears in the image sequence, the processing unit analyzes a moving trajectory of each object, extracts at least one characteristic point from each moving trajectory, classifies the at least one characteristic point of each moving trajectory within a predetermined time period into at least one cluster, and stores at least one characteristic parameter of each cluster into the storage unit.

As mentioned in the above, after receiving the image sequence, the invention analyzes the moving trajectory of each object in the image sequence, extracts the characteristic point from each moving trajectory, and classifies the characteristic point of each moving trajectory within the predetermined time period (e.g. 15 minutes, 30 minutes, etc.) into at least one cluster. Then, the invention stores the characteristic parameter of each cluster. The characteristic parameter of each cluster may be used to generate an image distribution map (e.g. heat map). Since the invention needs not to store the moving trajectory of each object, the invention can reduce data storage amount effectively, so as to reduce hardware loading.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
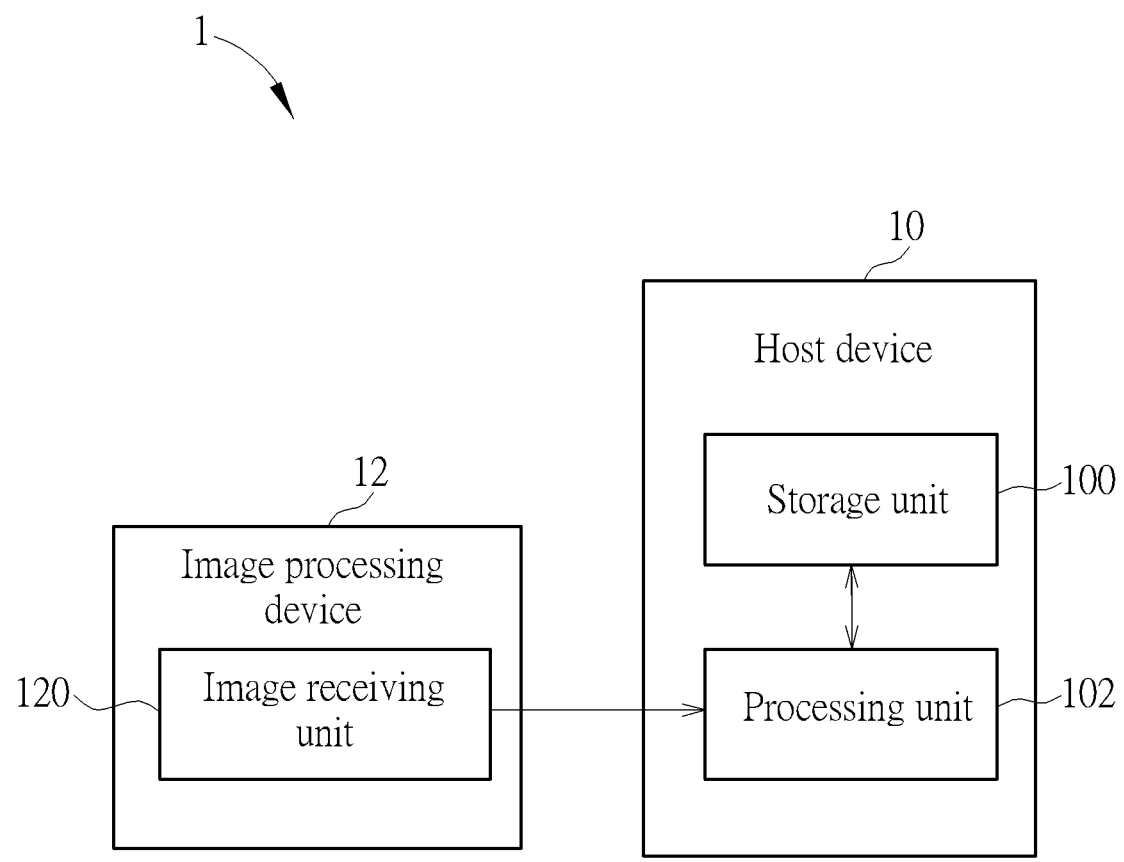
FIG. 1 is a functional block diagram illustrating an image processing system according to an embodiment of the invention.
Figure 2:
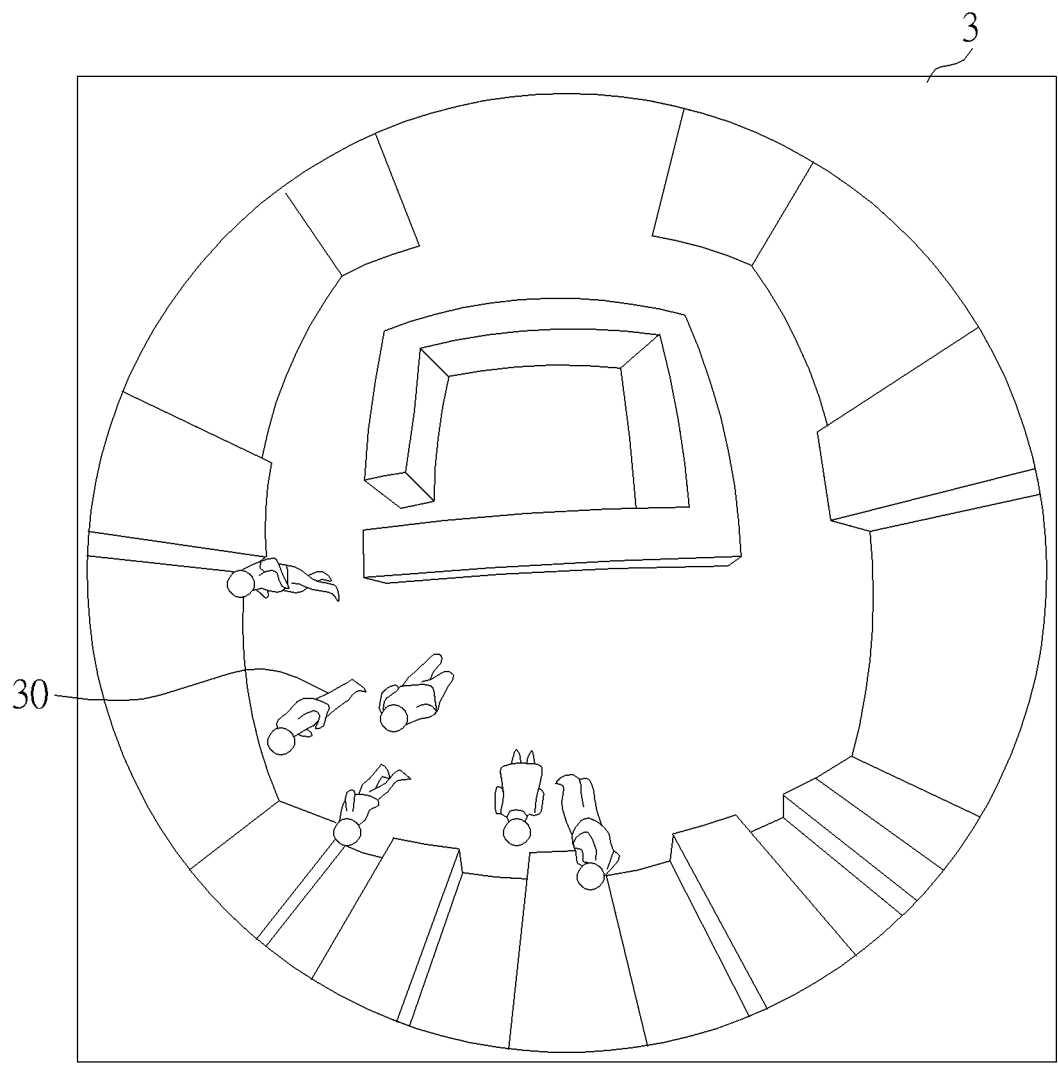
FIG. 2 is a schematic diagram illustrating an image sequence captured by an image processing device shown in FIG. 1.
Figure 3:
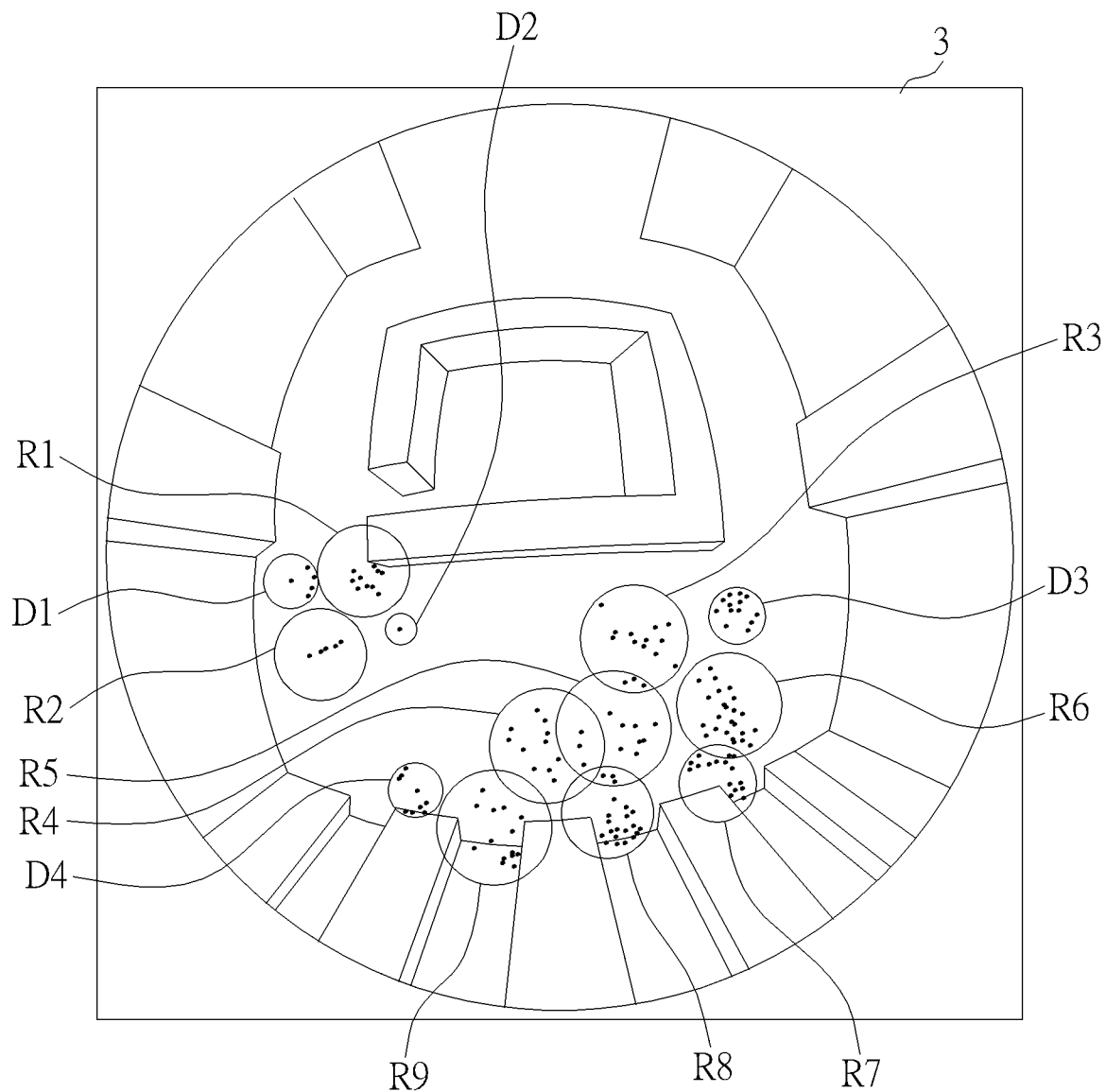
FIG. 3 is a schematic diagram illustrating a plurality of clusters generated according to the image sequence shown in FIG. 2.
Figure 4:
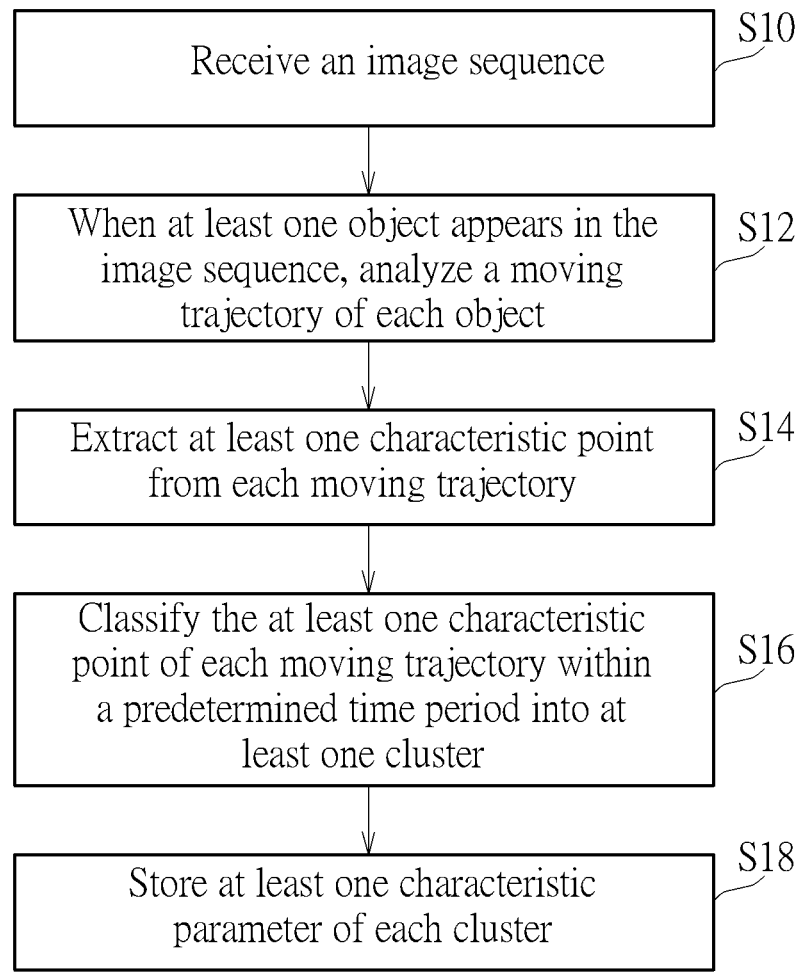
FIG. 4 is a flowchart illustrating an image processing method according to an embodiment of the invention.

Referring to FIGS. 1 to 4, FIG. 1 is a functional block diagram illustrating an image processing system 1 according to an embodiment of the invention, FIG. 2 is a schematic diagram illustrating an image sequence 3 captured by an image processing device 12 shown in FIG. 1, FIG. 3 is a schematic diagram illustrating a plurality of clusters R1-R9 and D1-D4 generated according to the image sequence 3 shown in FIG. 2, and FIG. 4 is a flowchart illustrating an image processing method according to an embodiment of the invention. The image processing method shown in FIG. 4 is adapted to the image processing system 1 shown in FIG. 1.

As shown in FIG. 1, the image processing system 1 comprises a host device 10 and an image processing device 12, wherein the image processing device 12 communicates with the host device 10. In this embodiment, the host device 10 may be a computer, a server, or other electronic devices with data calculating/processing function, and the image processing device 12 may be a network camera/IP camera, a network video recorder (NVR), or other electronic devices with image receiving function. In practical applications, the image processing device 12 12 may communicate with the host device 10 by wired or wireless manner. A communication network between the image processing device 12 and the host device 10 may be a local area network or Internet.

In this embodiment, the host device 10 comprises a storage unit 100 and a processing unit 102, wherein the processing unit 102 is electrically connected to the storage unit 100. In practical applications, the storage unit 100 may be a memory, a hard disc, or other data storage devices; and the processing unit 102 may be a processor or a controller with data processing function. In general, the host device 10 may be further equipped with some necessary hardware or software components for specific purposes, such as a circuit board, a power supply, applications, a communication module, etc., and it depends on practical applications.

In this embodiment, the image processing device 12 comprises an image receiving unit 120. In practical applications, the image receiving unit 120 may be a charge coupled device (CCD) sensor or a complementary metal-oxide-semiconductor (CMOS) sensor. In general, the image processing device 12 may be further equipped with some necessary hardware or software components for specific purposes, such as a circuit board, a power supply, applications, a communication module, a lens, etc., and it depends on practical applications.

The image processing system 1 of the invention can be used to generate an image distribution map, wherein the image distribution map may be, but not limited to, a heat map. When the image processing system 1 is used to generate the image distribution map, first of all, the image receiving unit 120 receives an image sequence 3 (step S10 in FIG. 4). It should be noted that, to simplify the illustration, FIG. 2 illustrates one single static image to represent the image sequence 3. In practical applications, the image sequence 3 is a dynamic image consisting of a plurality of images received at different time points. After receiving the image sequence 3, the image processing device 12 transmits the image sequence 3 to the host device 10. As shown in FIG. 2, a plurality of objects appears in the image sequence 3. It should be noted that the number of objects appearing in the image sequence 3 may be one or more than one and the invention is not limited to the embodiment shown in FIG. 2. Furthermore, the object 30 shown in FIG. 2 is exemplified by a human. However, in another embodiment, the object appearing in the image sequence 3 may also be a vehicle, an animal, or other objects.

When at least one object 30 appears in the image sequence 3, the processing unit 102 analyzes a moving trajectory of each object 30 (step S12 in FIG. 4). Then, the processing unit 102 extracts at least one characteristic point from each moving trajectory (step S14 in FIG. 4). In this embodiment, the characteristic point may comprise at least one of a begin point, an end point, a turn point, and a stop point of the moving trajectory of the object 30, wherein the begin point represents a position where the object 30 appears in the image sequence 3 in the beginning, the endpoint represents a position where the object 30 appears in the image sequence 3 in the end, the turn point represents a position where the object 30 makes a turn in the image sequence 3, and the stop point represents a position where the object 30 stops in the image sequence 3. For example, when the object 30 stops at a specific position in the image sequence 3 over a predetermined time threshold (e.g. 1 minute, 2 minutes, etc.), the specific position is the stop point. It should be noted that the invention may extract the characteristic point from the moving trajectory of the object 30 by Ramer-Douglas-Peucker algorithm or other manners, wherein the Ramer-Douglas-Peucker algorithm is well known by one skilled in the art and it will not be depicted herein.

Then, the processing unit 102 classifies the at least one characteristic point of each moving trajectory within a predetermined time period into at least one cluster (step S16 in FIG. 4). For example, if the predetermined time period is 15 minutes and the characteristic point comprises the begin point, the end point, the turn point, and the stop point of the moving trajectory of the object 30, the invention may classify all of the begin points, the end points, and the turn points within 15 minutes into at least one cluster (e.g. the plurality of clusters R1-R9 shown in FIG. 3) and classify all of the stop points within 15 minutes into at least one cluster (e.g. the plurality of clusters D1-D4 shown in FIG. 3). It should be noted that each of the clusters R1-R9 may comprise at least one begin point, at least one end point, and/or at least one turn point, and each of the clusters D1-D4 may comprise at least one stop point. It should be noted that the classification method for the aforesaid clusters may be referred to "https://en.wikipedia.org/wiki/Cluster_analysis" and it will not be depicted herein. Furthermore, the aforesaid predetermined time period may be set to be 3 minutes, 10 minutes, 30 minutes, or other time periods according to practical applications, so it is not limited to 15 minutes.

Then, the processing unit 102 stores at least one characteristic parameter of each cluster R1-R9 and D1-D4 into the storage unit 100 (step S18 in FIG. 4). As shown in FIG. 3, each cluster R1-R9 and D1-D4 may be represented by a circle, so the characteristic parameter of each cluster R1-R9 and D1-D4 may comprise XY coordinates of a center and a radius of the circle. In another embodiment, each cluster R1-R9 and D1-D4 may be represented by an ellipse, so the characteristic parameter of each cluster R1-R9 and D1-D4 may comprise XY coordinates of a center, a half long axis, a half short axis, and an angle of the ellipse. In another embodiment, each cluster R1-R9 and D1-D4 may be represented by a Gaussian distribution, so the characteristic parameter of each cluster R1-R9 and D1-D4 may comprise XY coordinates of a center and a sigma of the Gaussian distribution. It should be noted that the types of the aforesaid clusters may be referred to "https://en.wikipedia.org/wiki/Cluster_analysis" and it will not be depicted herein.

Still further, the aforesaid characteristic parameter may further comprise a number of characteristic points in each cluster R1-R9 and D1-D4. For each cluster R1-R9, the number of characteristic points is equal to the number of begin points, end points, and/or turn points; and for each cluster D1-D4, the number of characteristic points is equal to the number of stop points.

Moreover, when the at least one characteristic point comprises a stop point, the aforesaid characteristic parameter may further comprise an averaged stop time of the stop point.

In this embodiment, the processing unit 102 may further analyze a number of moving times between every two clusters. For example, for the clusters R1 and R2, the processing unit 102 may accumulate a number of moving times when each object 30 moves from the cluster R1 to the cluster R2 and accumulate a number of moving times when each object 30 moves from the cluster R2 to the cluster R1. Then, the processing unit 102 may store the number of moving times between every two clusters into the storage unit 100 and generate an image distribution map according to the stored characteristic parameter and/or the number of moving times between every two clusters. In this embodiment, the image distribution map may be, but not limited to, a heat map.

Figure 5:
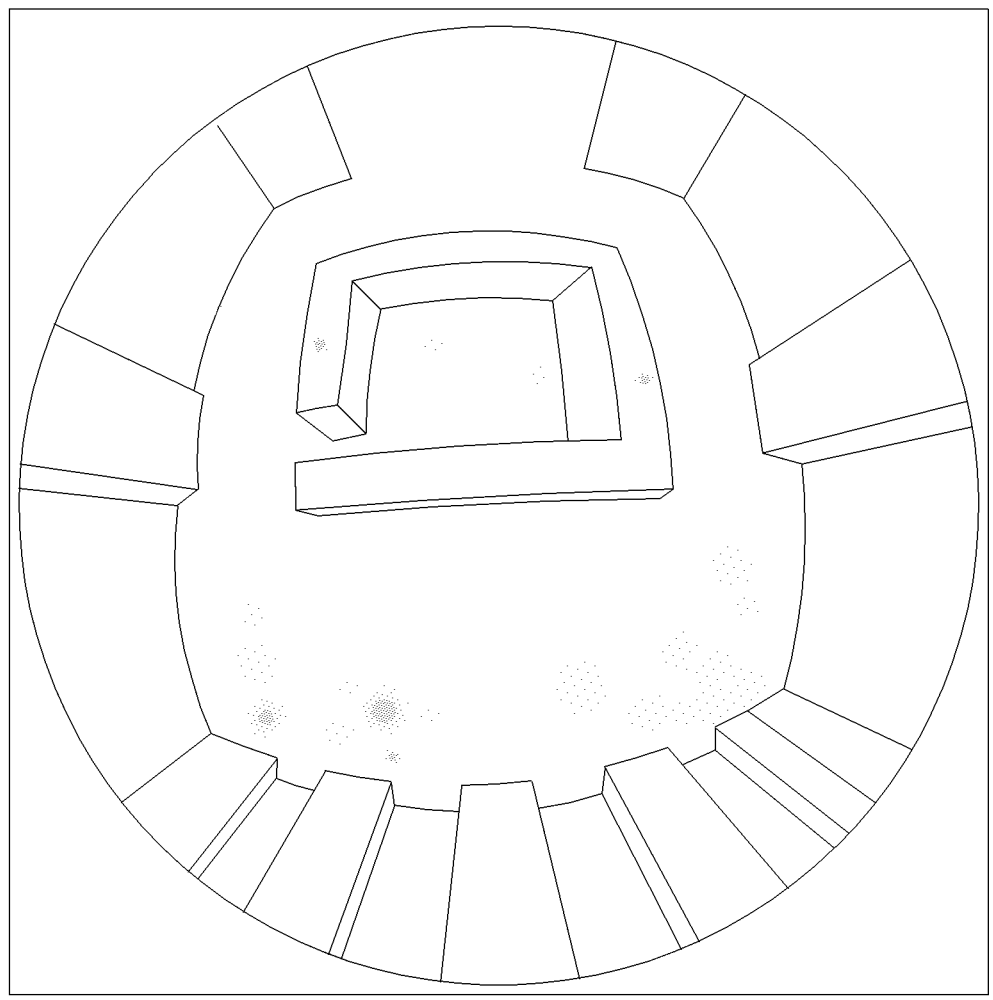
FIG. 5 is a schematic diagram illustrating a heat map generated according to the averaged stop time.
Figure 6:
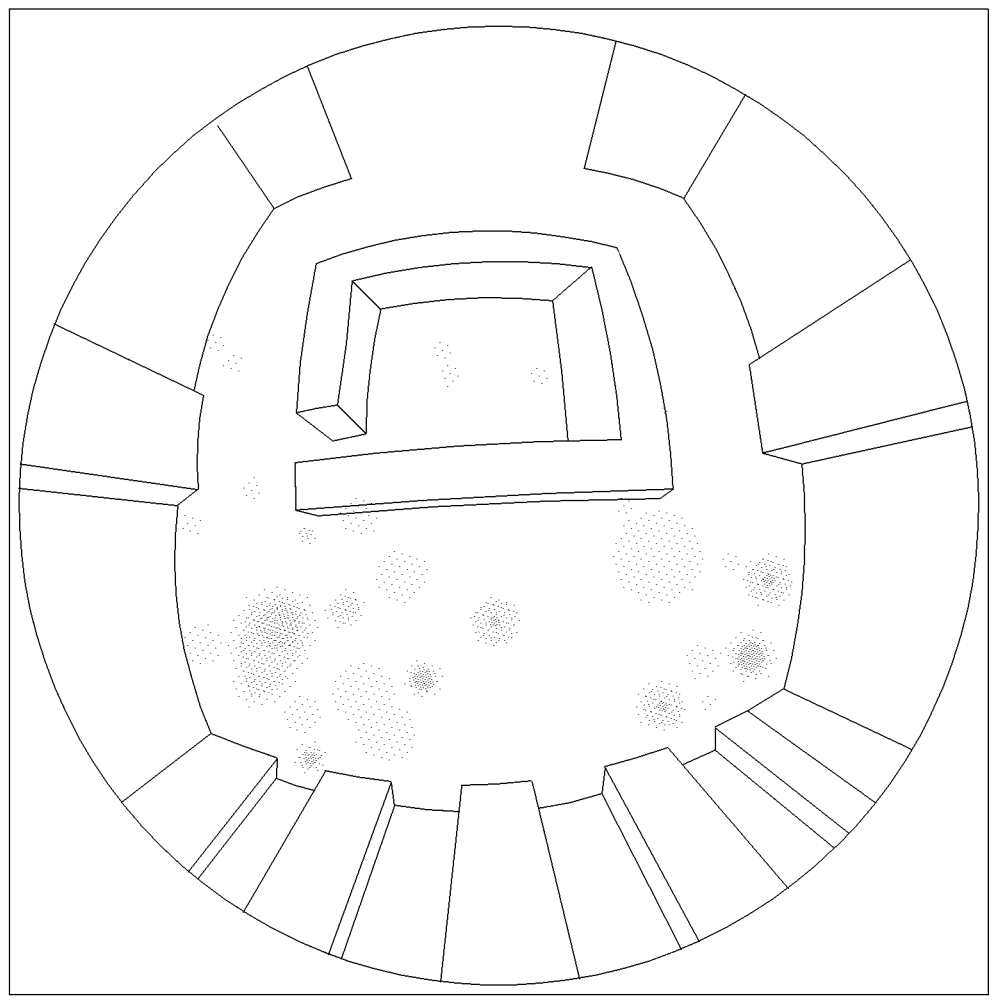
FIG. 6 is a schematic diagram illustrating a heat map generated according to the number of stop points.
Figure 7:
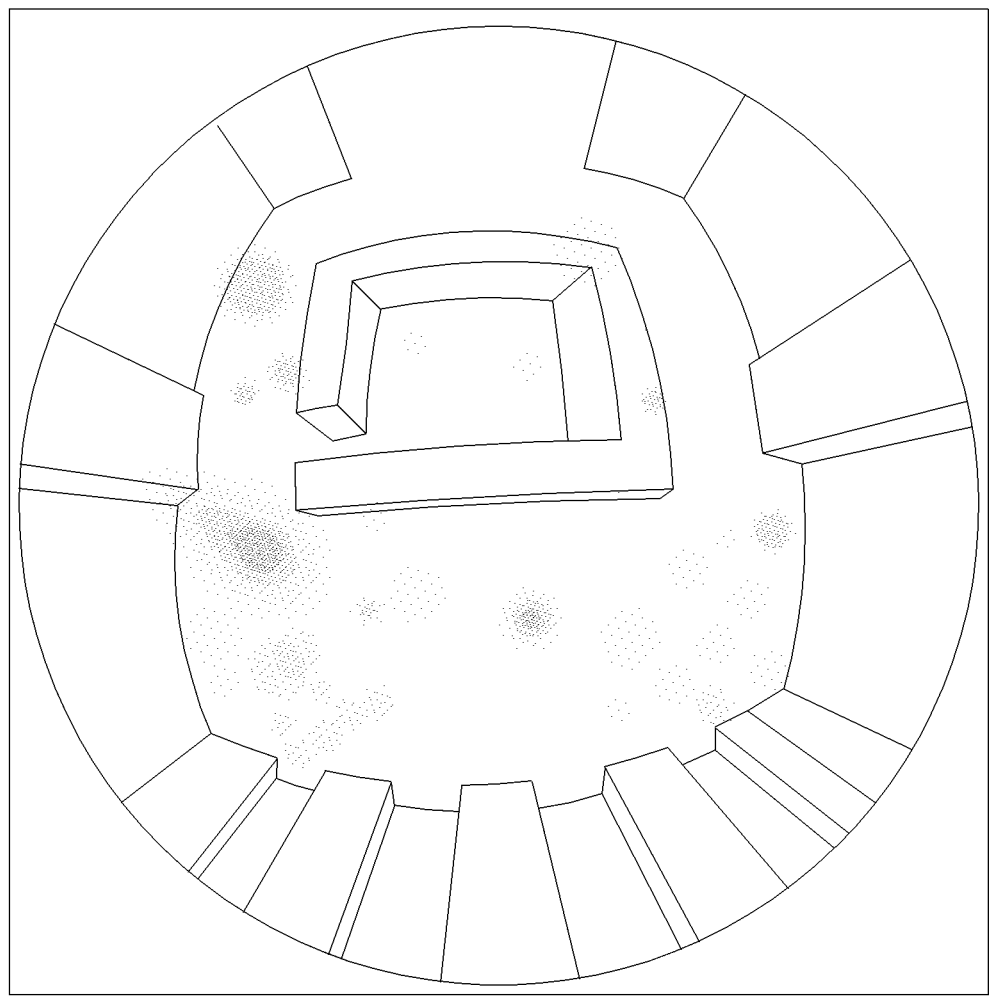
FIG. 7 is a schematic diagram illustrating a heat map generated by combining FIG. 5 and FIG. 6.
Figure 8:
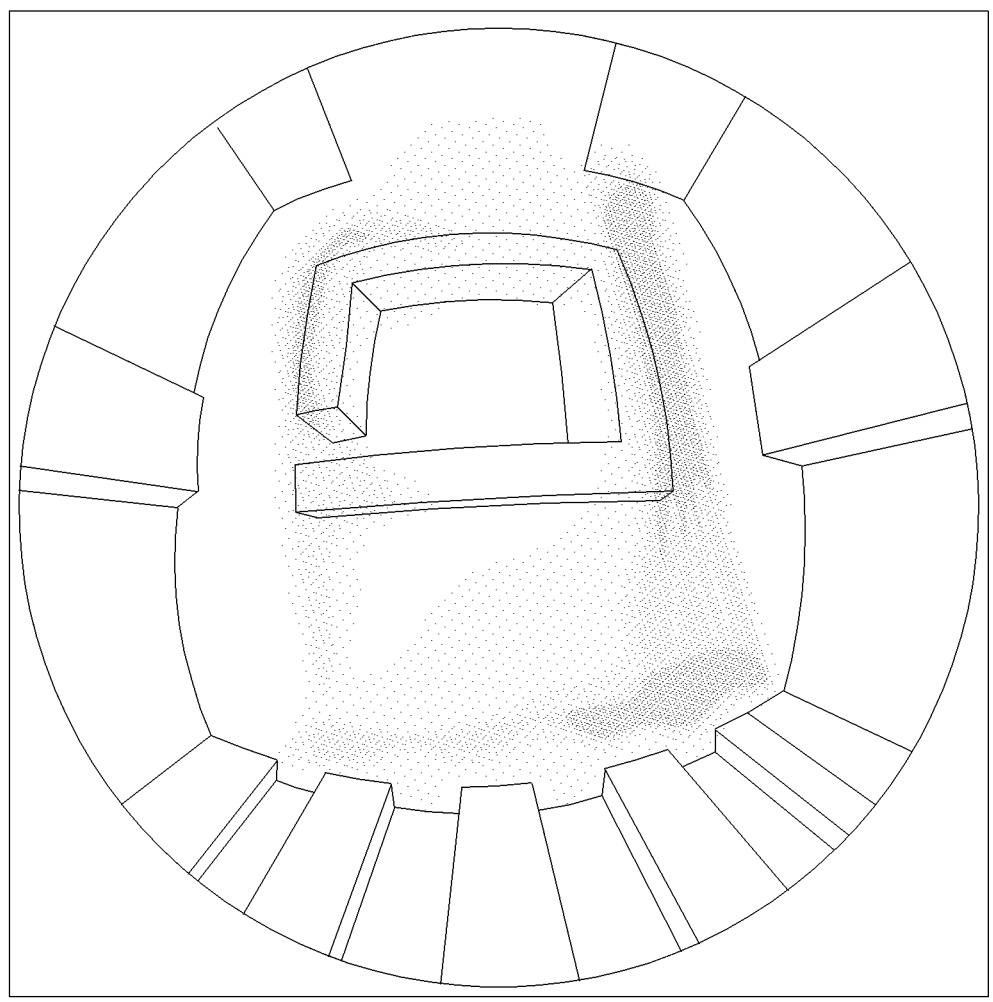
FIG. 8 is a schematic diagram illustrating a heat map generated according to the number of moving times between every two clusters.
Figure 9:
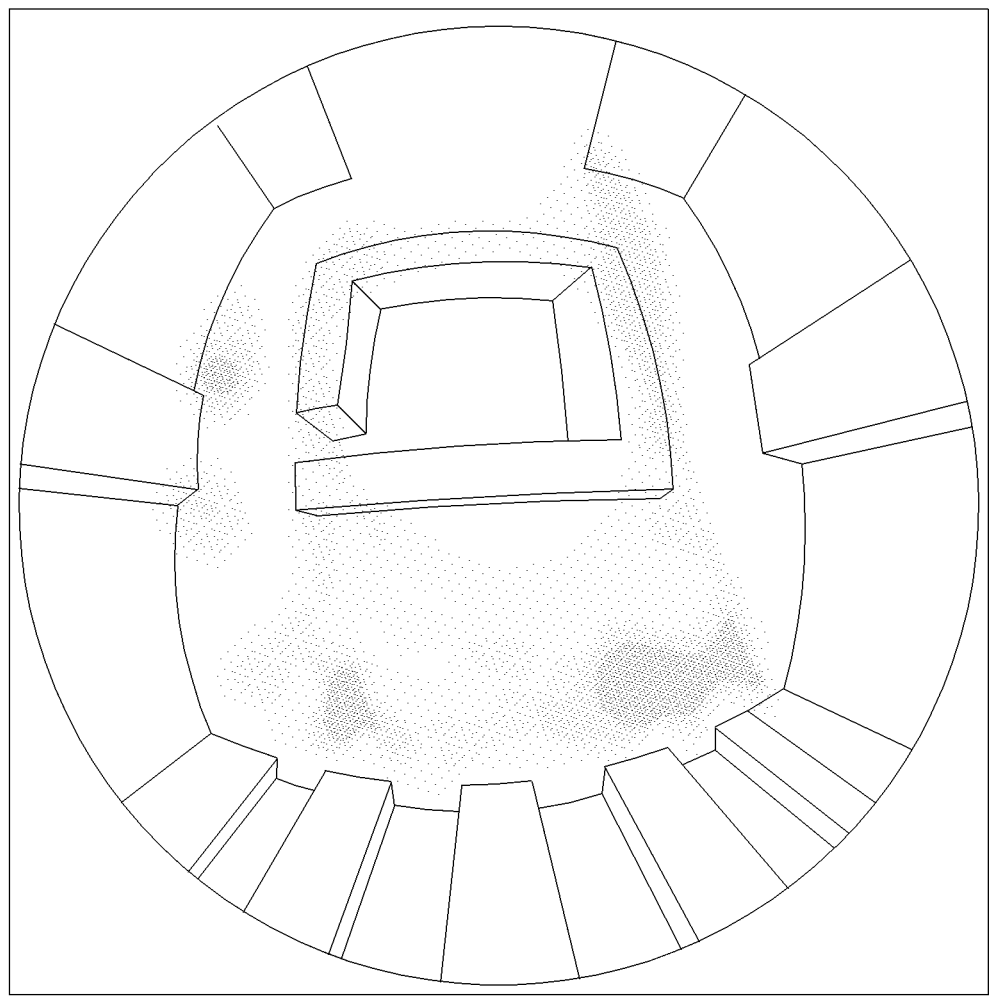
FIG. 9 is a schematic diagram illustrating a heat map generated by combining FIG. 7 and FIG. 8.

Referring to FIGS. 5 to 9, FIG. 5 is a schematic diagram illustrating a heat map generated according to the averaged stop time, FIG. 6 is a schematic diagram illustrating a heat map generated according to the number of stop points, FIG. 7 is a schematic diagram illustrating a heat map generated by combining FIG. 5 and FIG. 6, FIG. 8 is a schematic diagram illustrating a heat map generated according to the number of moving times between every two clusters, and FIG. 9 is a schematic diagram illustrating a heat map generated by combining FIG. 7 and FIG. 8. As shown in FIGS. 5 to 9, the processing unit 102 may generate different heat maps according to the stored characteristic parameter and/or the number of moving times between every two clusters for a user to refer. In practical applications, the method for generating the heat map may be referred to "https://www-.patrick-wied.at/static/heatmapjs/docs.html". Moreover, the method for representing color in the heat map may be referred to "http://docs.opencv.org/2.4/modules/contrib/doc/facerec/colormaps.html".

In addition, except to classify all of the characteristic points within the predetermined time period (e.g. 15 minutes) into a plurality of clusters, the invention may also combine all of characteristic points within a plurality of time periods (e.g. combine four continuous "15 minutes" time periods to obtain one "1 hour" time period or combine 2880 continuous "15 minutes" time periods to obtain one "1 month" time period) and then process all of the characteristic points within the combined time period by the aforesaid manner (e.g. draw the heat map and so on), so as to represent the statistic result within different time periods.

Furthermore, when analyzing the moving trajectory of each object 30, the invention may calculate a life cycle of each trajectory, i.e. the time period from the beginning to the end of each trajectory. Then, the invention may find out a trajectory with a life cycle less than a predefined shortest threshold (e.g. 3 minutes). For example, when the invention is applied to monitor and analyze retail images, the aforesaid data may represent that the stop time of a customer is abnormal (too short). Then, the invention may use the aforesaid manner to find out the characteristic points of the trajectory, classify the characteristic points into a plurality of clusters, and store the clusters into the database, so as to generate the heat map. Alternatively, the invention may find out a trajectory with a life cycle more than a predefined largest threshold (e.g. 10 minutes). For example, when the invention is applied to monitor and analyze retail images, the aforesaid data may represent that a customer is highly interested in a product. Then, the invention may use the aforesaid manner to find out the characteristic points of the trajectory, classify the characteristic points into a plurality of clusters, and store the clusters into the database, so as to generate the heat map.

It should be noted that the control logic of the image processing method of the invention can be implemented by software. Needless to say, each part or function of the control logic may be implemented by software, hardware or the combination thereof.

Figure 10:
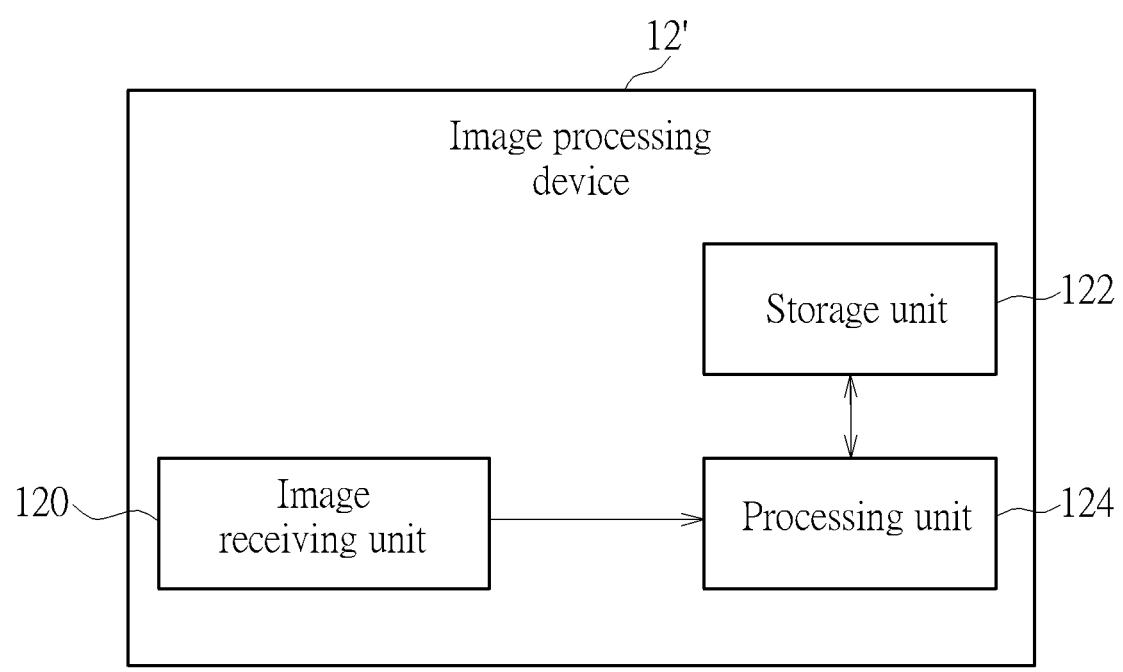
FIG. 10 is a functional block diagram illustrating an image processing device according to another embodiment of the invention.

Referring to FIG. 10, FIG. 10 is a functional block diagram illustrating an image processing device 12' according to another embodiment of the invention. As shown in FIG. 10, the image processing device 12' comprises an image receiving unit 120, a storage unit 122 and a processing unit 124. In this embodiment, the image processing device 12' may be a network camera/IP camera, a network video recorder (NVR), or other electronic devices with image receiving function. The principles of the image receiving unit 120, the storage unit 122, and the processing unit 124 are substantially the same as those of the image receiving unit 120, the storage unit 100, and the processing unit 102 mentioned in the above, so they will not be depicted herein again. The invention may integrate the image receiving unit 120, the storage unit 122, and the processing unit 124 into the image processing device 12' and then perform the image processing method shown in FIG. 3 by the image processing device 12+.

In other words, the image processing method of the invention may be performed by the image processing device 12 with the host device 10 or performed by the image processing device 12' according to practical applications.

As mentioned in the above, after receiving the image sequence, the invention analyzes the moving trajectory of each object in the image sequence, extracts the characteristic point from each moving trajectory, and classifies the characteristic point of each moving trajectory within the predetermined time period (e.g. 15 minutes, 30 minutes, etc.) into at least one cluster. Then, the invention stores the characteristic parameter of each cluster. The characteristic parameter of each cluster may be used to generate an image distribution map (e.g. heat map). Since the invention needs not to store the moving trajectory of each object, the invention can reduce data storage amount effectively, so as to reduce hardware loading.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing system comprising:
   a host device comprising a storage and a processor, the processor being electrically connected to the storage; and
   an image processing device communicating with the host device, the image processing device comprising an image receiver, the image receiver receiving an image sequence and transmitting the image sequence to the host device;
   wherein when at least one object appears in the image sequence, the processor analyzes a moving trajectory of each object, extracts at least one characteristic point from each moving trajectory, classifies the at least one characteristic point of each moving trajectory within a predetermined time period into at least one cluster, and stores at least one characteristic parameter of each cluster into the storage.

2. The image processing system of claim 1, wherein the at least one characteristic point comprises at least one of a begin point, an end point, a turn point, and a stop point.

3. The image processing system of claim 1, wherein each cluster is represented by a circle and the at least one characteristic parameter comprises a center and a radius of the circle.

4. The image processing system of claim 1, wherein the at least one characteristic parameter comprises a number of characteristic points in the cluster.

5. The image processing system of claim 1, wherein when the at least one characteristic point comprises a stop point, the at least one characteristic parameter comprises an averaged stop time of the stop point.

\* \* \* \* \*